United States Patent
Yamakage

(10) Patent No.: US 10,554,381 B2
(45) Date of Patent: Feb. 4, 2020

(54) MMT TRANSMISSION SYSTEM, ENCRYPTION PROCESSING DEVICE, AND RECEIVER

(71) Applicant: Kabushiki Kaisha Toshiba, Minato-ku, Tokyo (JP)

(72) Inventor: Tomoo Yamakage, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 567 days.

(21) Appl. No.: 15/256,424

(22) Filed: Sep. 2, 2016

(65) Prior Publication Data
US 2016/0373247 A1    Dec. 22, 2016

Related U.S. Application Data

(63) Continuation of application No. PCT/JP2015/055630, filed on Feb. 26, 2015.

(30) Foreign Application Priority Data

Mar. 6, 2014    (JP) ................ 2014-044220

(51) Int. Cl.
  *H04L 9/00*    (2006.01)
(52) U.S. Cl.
  CPC ..................... *H04L 9/00* (2013.01)
(58) Field of Classification Search
  CPC ....................................................... H04L 9/00
  See application file for complete search history.

(56) References Cited

U.S. PATENT DOCUMENTS 9,807,452 B2 *   10/2017  Freeman ............ H04N 21/4385
2002/0059614 A1 *  5/2002  Lipsanen ............... H04N 7/163
                                                                725/75
(Continued)

FOREIGN PATENT DOCUMENTS

| JP | 2001-258003 A | 9/2001 |
| JP | 2005-124147 A | 5/2005 |
| JP | 2016-092532 A | 5/2016 |

OTHER PUBLICATIONS

Kawamura et al., "A Study on Multiplexing Scheme for MPEG-2 TS Content over MMT," IPSJ SIG Notes Audio Visual Fukugo Joho Shori (AVM), vol. 2014-AVM-84 No. 1,—41 pages.
(Continued)

*Primary Examiner* — William S Powers
(74) *Attorney, Agent, or Firm* — Knobbe, Martens, Olson & Bear, LLP

(57) ABSTRACT

An MMT transmission system includes first and second material output devices, first and second multiplexing devices, first and second encryption processing device, and a switching device. The first encryption processing device encrypts a first payload, except for a first MPU sequence number, of a first MMTP packet included in first multiplexed data output from the first multiplexing device. The second encryption processing device encrypts a second payload, except for a second MPU sequence number, of a second MMTP packet included in second multiplexed data output from the second multiplexing device. The switching device acquires a first MPU boarder from the first MPU sequence number, a second MPU boarder from the second MPU sequence number, and switches transmissions of the multiplexed data at these boarders.

18 Claims, 8 Drawing Sheets

(56) References Cited

U.S. PATENT DOCUMENTS

| | | | |
|---|---|---|---|
| 2011/0093717 A1* | 4/2011 | Iwao | H04L 9/12 713/179 |
| 2013/0064563 A1* | 3/2013 | Shibuya | G03G 15/0266 399/50 |
| 2013/0074141 A1* | 3/2013 | Hwang | H04N 21/8126 725/116 |
| 2013/0094563 A1 | 4/2013 | Bae | |
| 2014/0314080 A1* | 10/2014 | Park | H04L 47/23 370/391 |
| 2014/0379903 A1* | 12/2014 | Bouazizi | H04L 29/06027 709/224 |
| 2015/0089560 A1* | 3/2015 | Park | H04L 65/607 725/116 |

OTHER PUBLICATIONS

First Office Action dated Apr. 12, 2016 of corresponding Japanese Application No. 2014-044220—15 pages.

Otake et al., "Scramble System for MPEG Media Transport," dated Mar. 18, 2014—1 page.

Park, et al., International Organization for Standardization Organization International de Normalisation ISO/IEC JTC1/SC29/WG11 Coding of Moving Pictures and Audio, dated Oct. 2012—14 pages.

Aoki, et al., "A Study on MMT for Hybrid Delivery on Broadcast and Broadband," IPSJ SIG Notes Audio Visual Fukugo Joho Shori (AVM), Feb. 14, 2014, vol. 2014-AVM-84, No. 2, pp. 1-6.

Draft report of Broadcasting systems Committee, Ministry of International Affairs and Communications (MIC), Feb. 2014, pp. 130 and 169.

International Search Report mailed by Japan Patent Office dated Apr. 14, 2015 in the corresponding PCT Application No. PCT/JP2015/055630—5 pages.

Written Opinion by Japan Patent Office dated Apr. 14, 2015 in the corresponding PCT Application No. PCT/JP2015/055630 (Japanese language only)—7 pages.

Background Art Information provided by Toshiba (Concise Explanation for Draft Report of Broadcasting systems Committee)—1 page.

English Translation of IPRP issued by the International Bureau of WIPO dated Sep. 15, 2016 in the corresponding PCT application No. PCT/JP2015/055630—10 pages.

Information technology—High efficiency coding and media delivery in heterogeneous environments—Part 1: MPEG media transport (MMT), Élément introductif—Élément central—Partie 1: Titre de la partie, ISO/IEC 2013.

\* cited by examiner

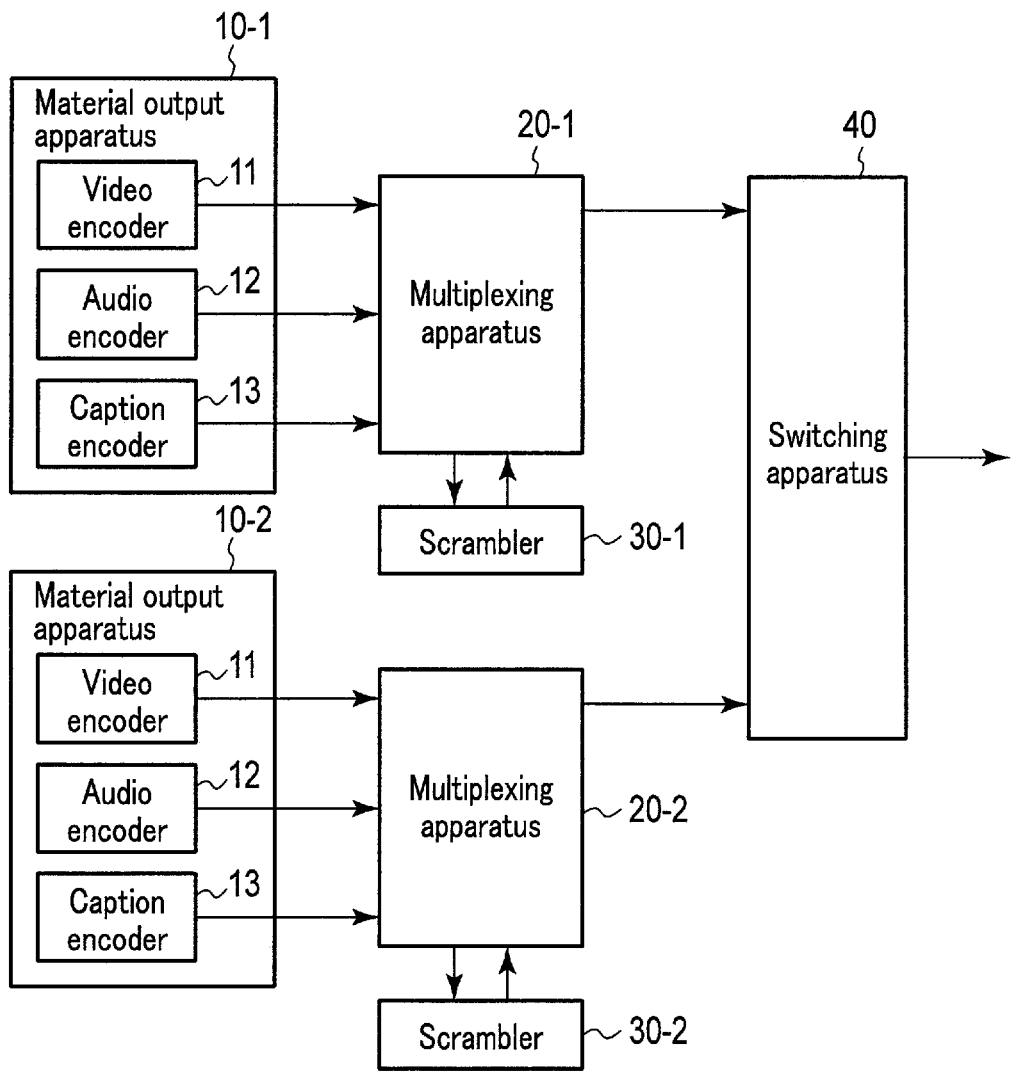
F I G. 1

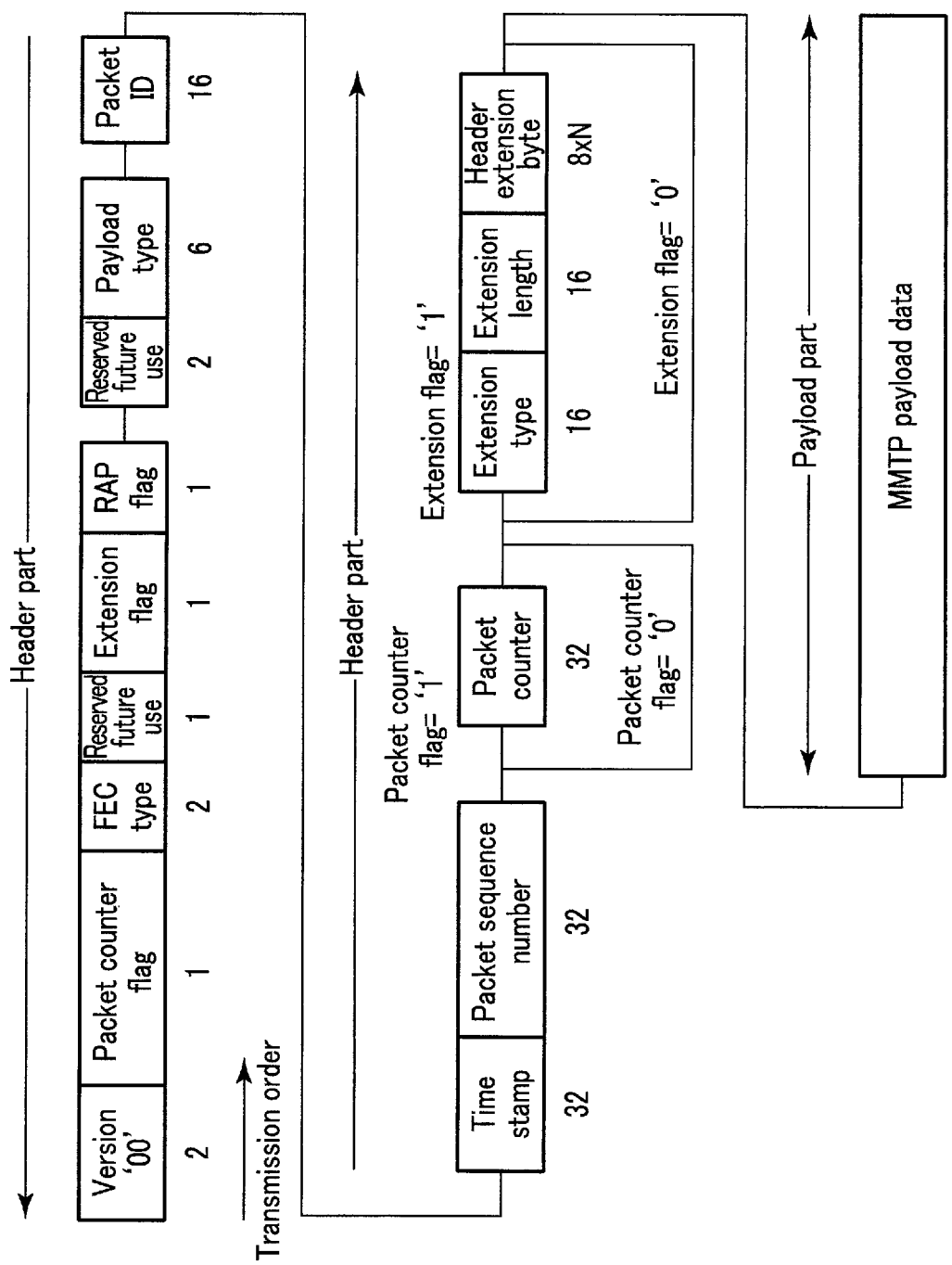
F I G. 2

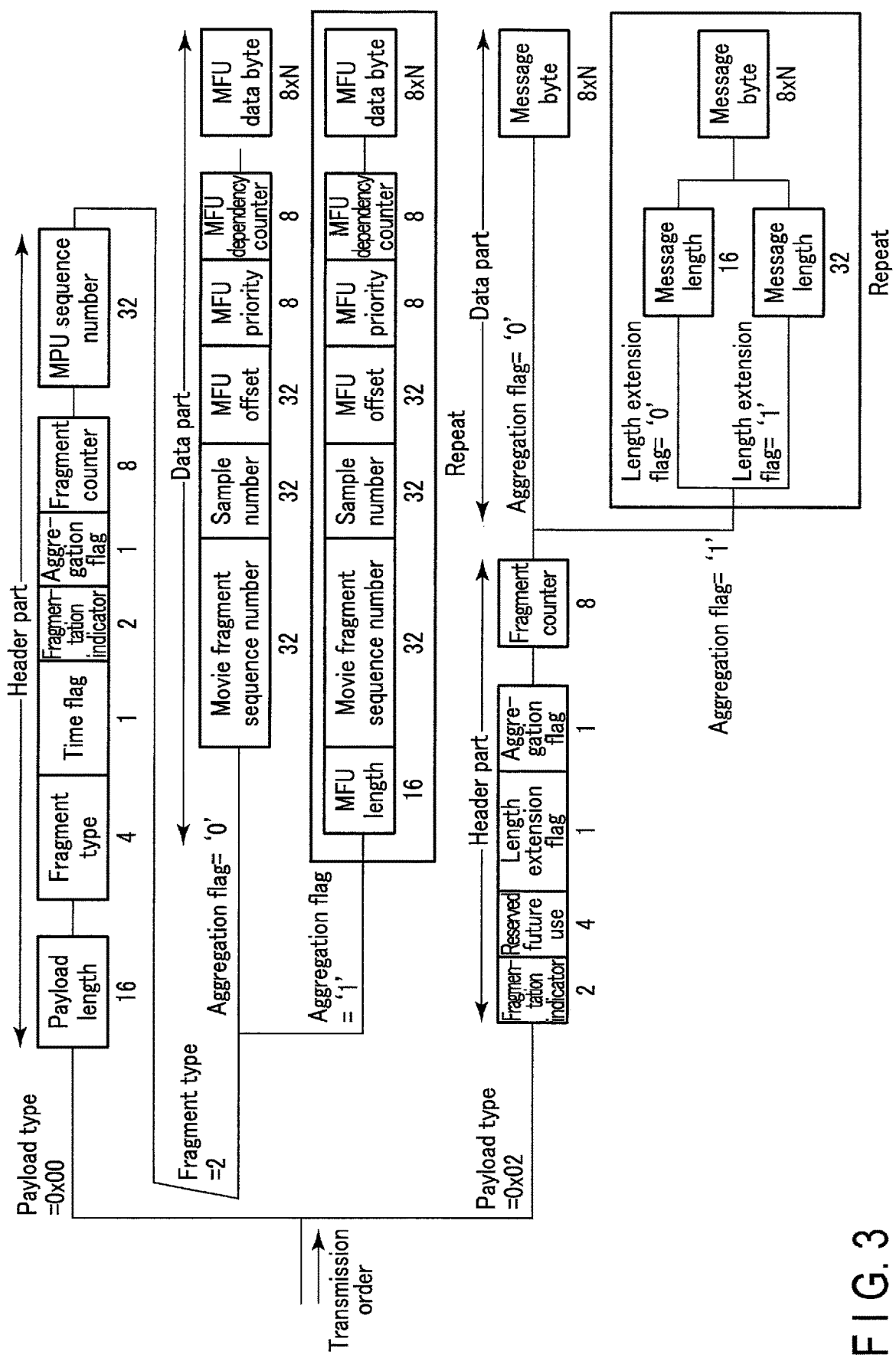
F I G. 3

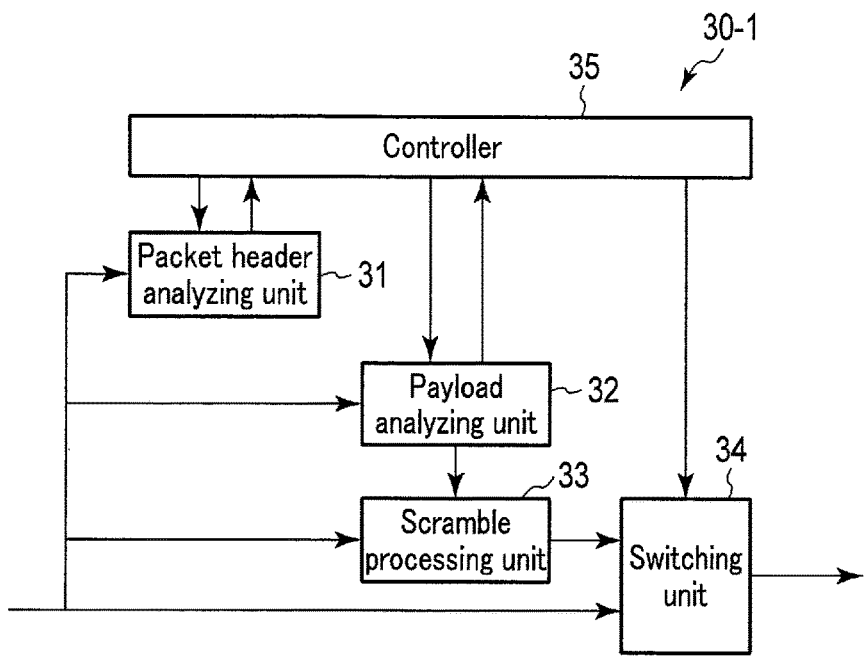
F I G. 4
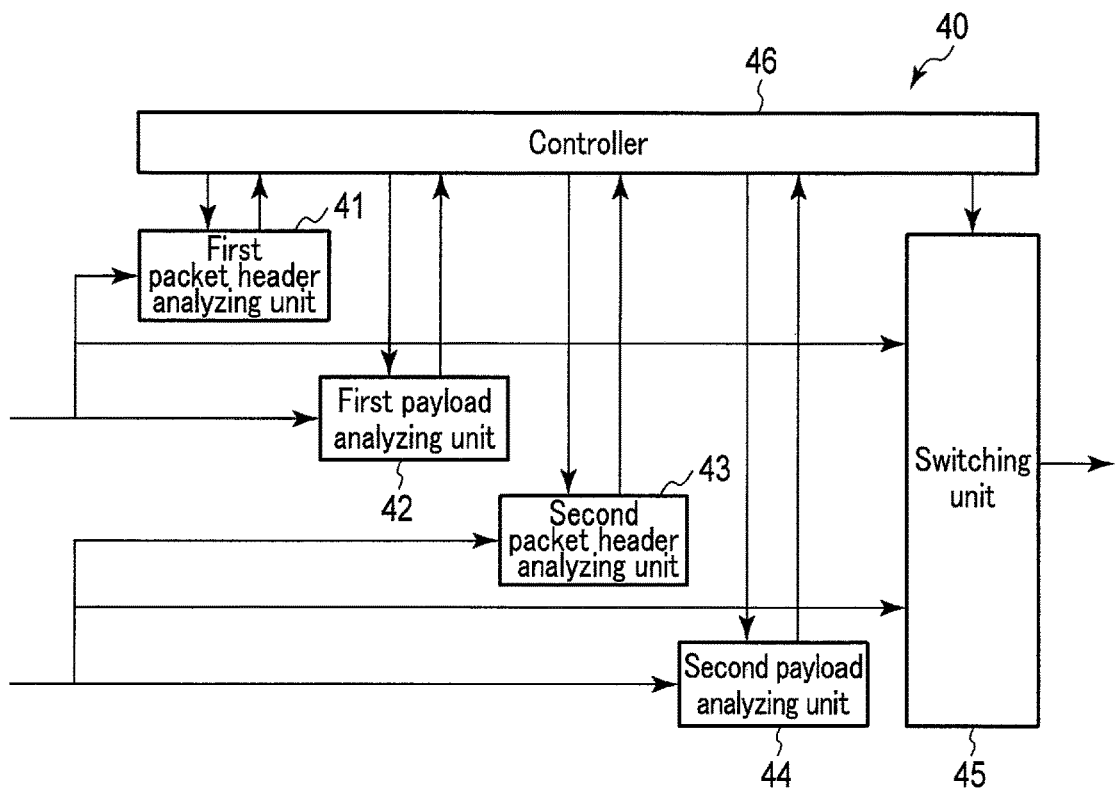
F I G. 5

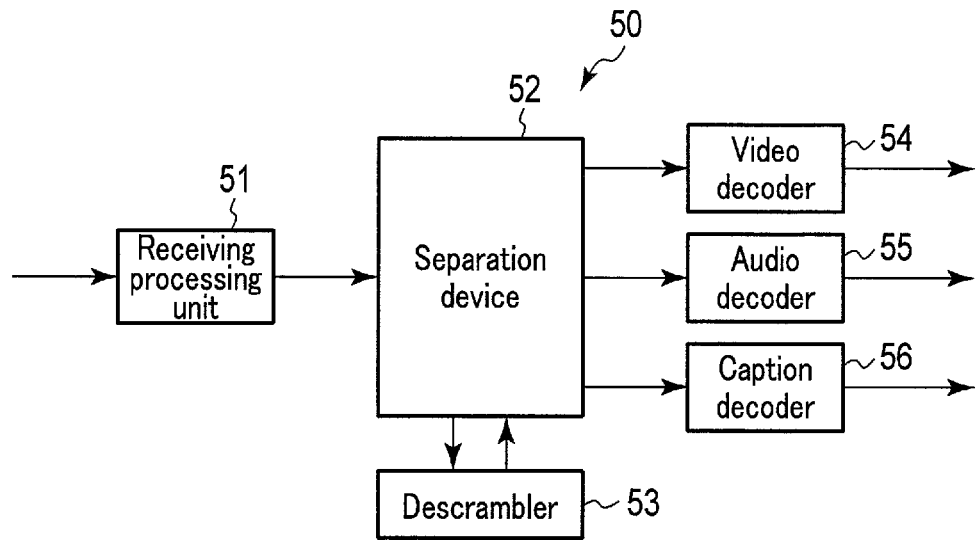
F I G. 7
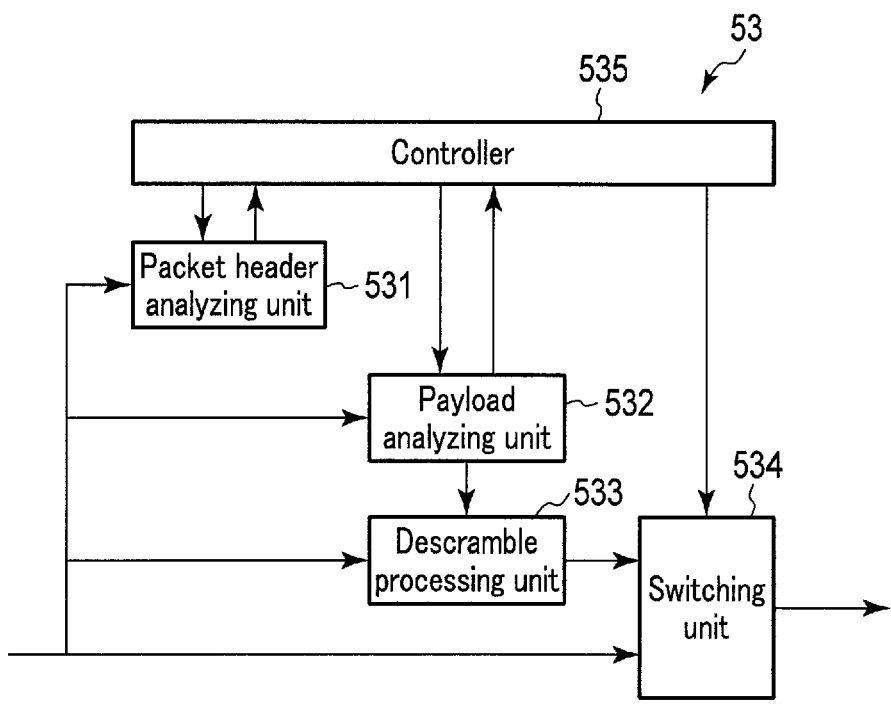
F I G. 8

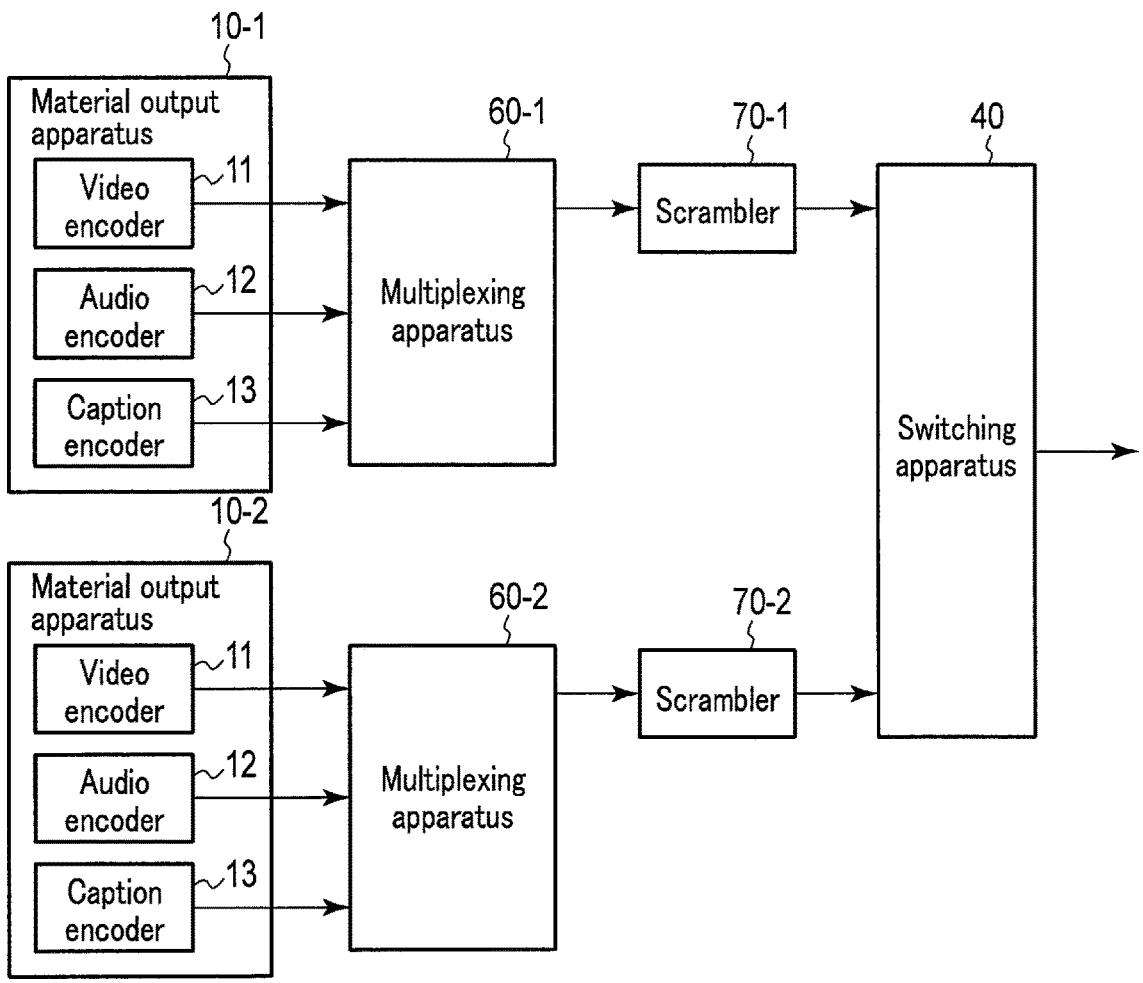
F I G. 9
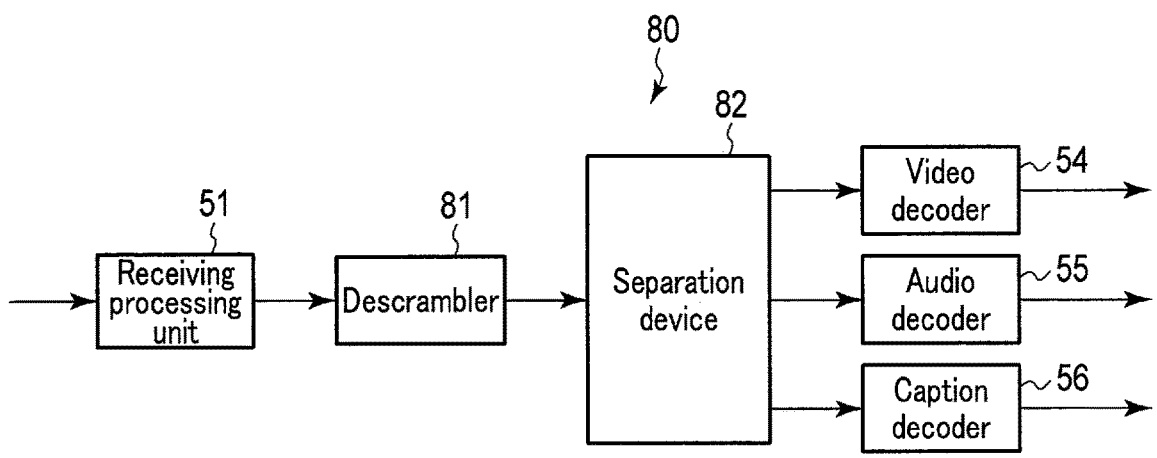
F I G. 10

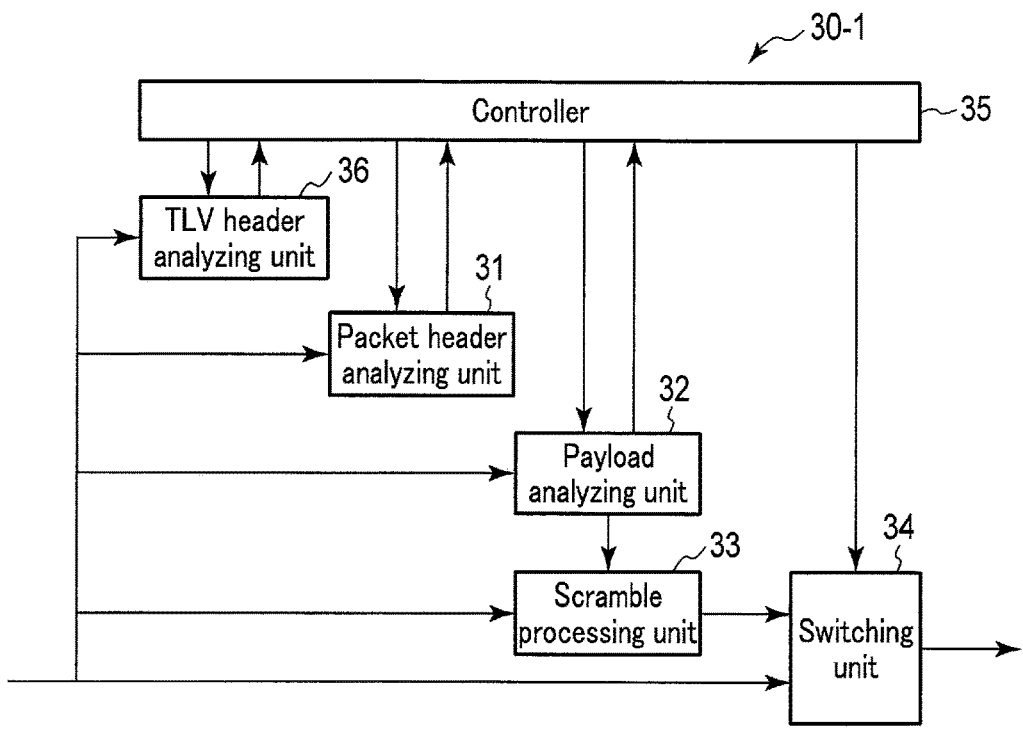
F I G. 11
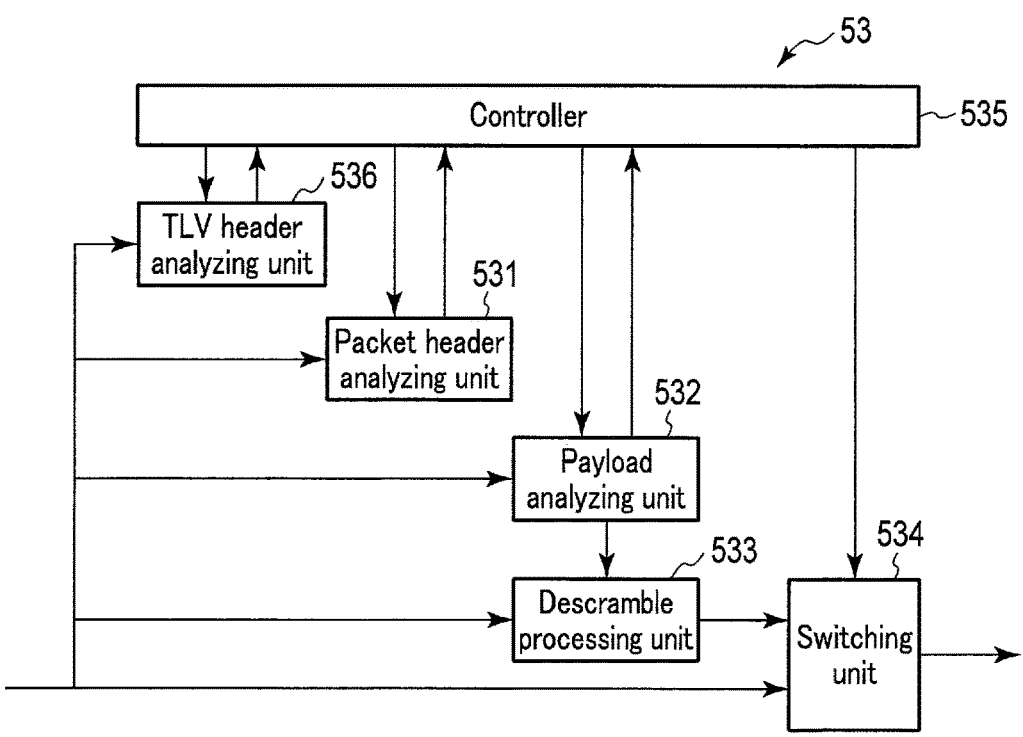
F I G. 12 ically as possible between a main system and a redundant system upon, for example, maintenance. In the case of seamlessly switching between the main system and the redundant system, it is necessary for the switching device to identify an MPU (Media Processing Unit) boarder to identify a switching point. However, in order to identify the MPU boarder in the MMTP packet to which scrambling has been applied, the payload in the MMTP packet needs to be analyzed. Therefore, there has been a problem that the MMTP packet to which scrambling has been applied needs to be descrambled.

US 10,554,381 B2

MMT TRANSMISSION SYSTEM, ENCRYPTION PROCESSING DEVICE, AND RECEIVER

CROSS-REFERENCE TO RELATED APPLICATIONS

This application is a Continuation application of PCT Application No. PCT/JP2015/055630, filed Feb. 26, 2015 and based upon and claims the benefit of priority from prior Japanese Patent Application No. 2014-044220, filed Mar. 6, 2014, the entire contents of which are incorporated herein by reference.

FIELD

The embodiments of the present invention relate to an MMT transmission system which transmits data by utilizing MMT (MPEG Multimedia Transport, ISO/IEC 23008-1), an encryption processing apparatus used in this system, and a receiver which receives data transmitted from this system.

BACKGROUND

In the current broadcasting system, media transport schemes of an MPEG-2 TS (Moving Picture Experts Group-2 Transport Stream) scheme and an RTP (Real-time Transport Stream) scheme are widely used. In these schemes, when attempting to cooperatively operate broadcasting and communication, various limitations arise. Therefore, MMT (MPEG Media Transport) is proposed as a new media transport scheme assuming the use of a variety of networks by utilizing MPEG.

In an MMT transmission system adopting the MMT, in order to secure confidentiality of an MMTP (MPEG Media Transport Protocol) packet which is to be transmitted, scrambling is applied to the MMTP packet. A payload part of the MMTP packet, excluding a control message, is the scrambling range.

In some cases, the MMT transmission system builds up a redundant configuration so that its function is maintained even in the case where a failure, etc. has occurred. A switching device provided on the MMT transmission system is desired to perform switching as seamlessly as possible between a main system and a redundant system upon, for example, maintenance. In the case of seamlessly switching between the main system and the redundant system, it is necessary for the switching device to identify an MPU (Media Processing Unit) boarder to identify a switching point. However, in order to identify the MPU boarder in the MMTP packet to which scrambling has been applied, the payload in the MMTP packet needs to be analyzed. Therefore, there has been a problem that the MMTP packet to which scrambling has been applied needs to be descrambled.

BRIEF DESCRIPTION OF THE DRAWINGS

FIG. 1 is a block diagram showing an example of a functional configuration of an MMT transmission system according to a first embodiment.
FIG. 2 is a block diagram showing a structure of an MMTP packet.
FIG. 3 is a block diagram showing a structure of a payload part of the MMTP packet shown in FIG. 2.
FIG. 4 is a block diagram showing a functional configuration of a scrambler shown in FIG. 1.
FIG. 5 is a block diagram showing a functional configuration of a switching device shown in FIG. 1.
FIG. 7 is a block diagram showing a functional configuration of a receiver according to the first embodiment.
FIG. 8 is a block diagram showing a functional configuration of a descrambler shown in FIG. 7.
FIG. 9 is a block diagram showing a functional configuration of an MMT transmission system according to a second embodiment.
FIG. 10 is a block diagram showing a functional configuration of a receiver according to the second embodiment.
FIG. 11 is a block diagram showing another example of a functional configuration of a scrambler.
FIG. 12 is a block diagram showing another example of a functional configuration of a descrambler.

DETAILED DESCRIPTION

Figure 6:
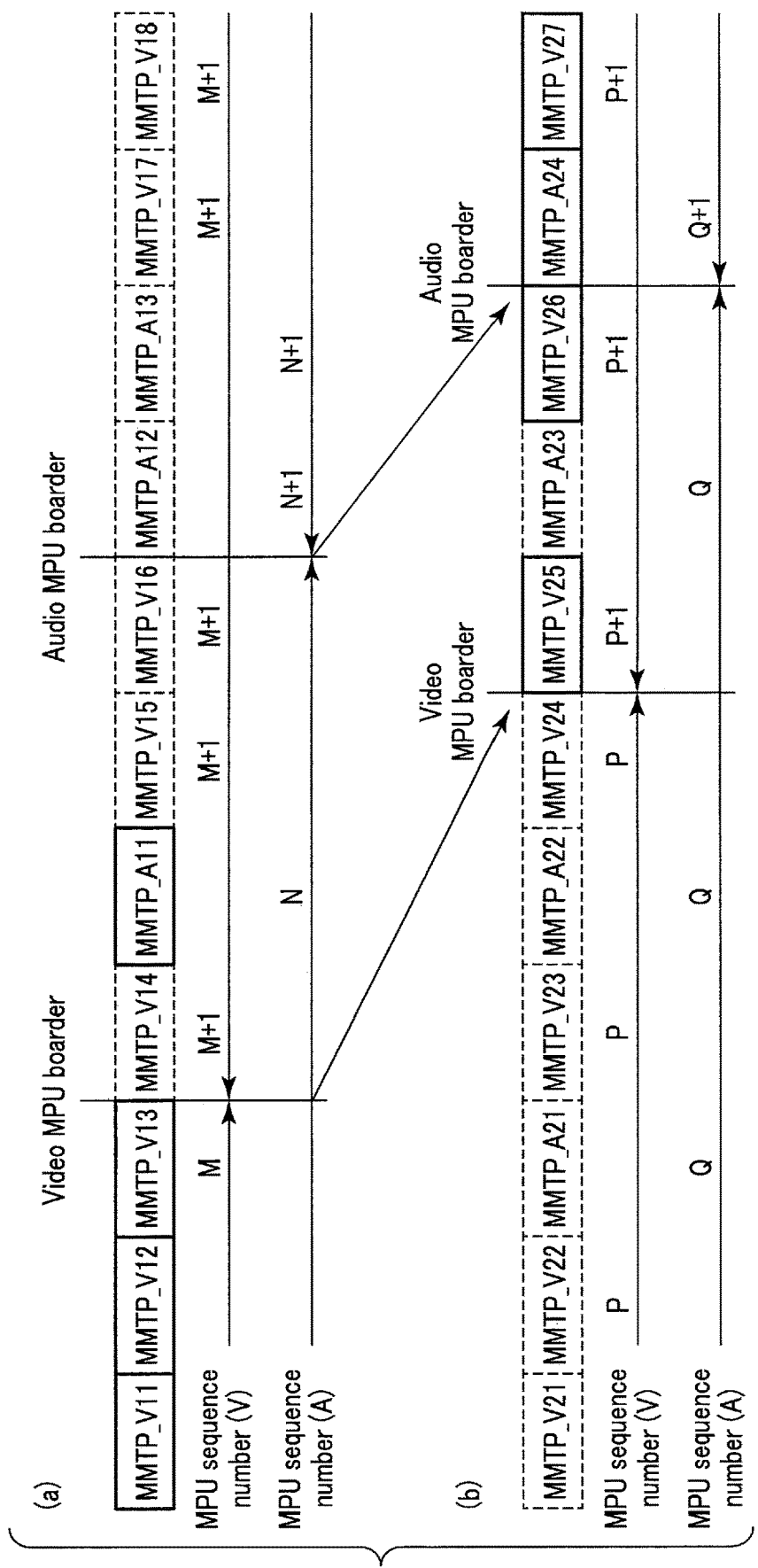
FIG. 6 is a diagram showing switching processing performed by the switching device shown in FIG. 5.

In general, according to an embodiment, an MMT transmission system includes first and second material output apparatus, first and second multiplexing apparatus, first and second encryption processing apparatus, and a switching apparatus. The first material output apparatus transmits a first MMTP packet. The first multiplexing apparatus multiplexes the first MMTP packet to obtain first multiplexed data. The first encryption processing apparatus encrypts a first payload of the first MMTP packet, excluding at least a first MPU sequence number, included in the first multiplexed data. The second material output apparatus transmits a second MMTP packet. The second multiplexing apparatus multiplexes the second MMTP packet to obtain second multiplexed data. The second encryption processing apparatus encrypts a second payload of the second MMTP packet, excluding at least a second MPU sequence number, included in the second multiplexed data. The switching apparatus receives the first and the second multiplexed data encrypted by the first and the second encryption processing apparatuses, acquires a first MPU boarder from the first MPU sequence number described in the first payload, acquires a second MPU boarder from the second MPU sequence number described in the second payload, and switches transmission from the first multiplexed data to the second multiplexed data at the first MPU boarder and the second MPU boarder in accordance with a switching instruction.

Embodiments will be described with reference to the drawings.

First Embodiment

FIG. 1 is a block diagram showing an example of a functional configuration of an MMT (MPEG Media Transport) transmission system according to a first embodiment. The MMT transmission system shown in FIG. 1 comprises material output devices 10-1 and 10-2, multiplexing devices 20-1 and 20-2, scramblers 30-1 and 30-2, and a switching device 40.

The material output device 10-1 comprises, for example, a CPU (Central Processing Unit), an FPGA (Field Programmable Gate Array) which performs a predetermined processing in accordance with the control from the CPU, and a storage memory for storing data. The material output device 10-1 realizes, for example, a video encoder 11, an audio encoder 12, and a caption encoder 13 by having the CPU execute the functions designed in the FPGA. The video encoder 11 encodes video data in order to form an MMTP (MPEG Media Transport Protocol) packet of a sequence of video images. The audio encoder 12 encodes audio data to form an MMTP packet of audio. The caption encoder 13 encodes caption data to form an MMTP packet of closed captions. The material output device 10-1 outputs a plurality of kinds of MMTP packets for video images, audio, and closed captions to the multiplexing device 20-1.

The material output device 10-1 may also be configured to comprise an LSI instead of the FPGA. The material output device 10-1 may also be configured to perform a predetermined processing by the CPU that executes software processing.

For example, the MMTP packet has a structure shown in FIG. 2. In other words, the MMTP packet shown in FIG. 2 comprises a header part where packet information regarding the MMTP packet is included, and a payload part where actual data is included.

FIG. 3 is a schematic view showing the structure of the payload part. The payload shown in FIG. 3 comprises a header part where payload information regarding the payload part is included, and a data part where MFU data is included. In FIG. 3, the part referred to as the header part for convenience of explanation indicates a portion of a predetermined number of bytes from the head of the payload. The predetermined number of bytes from the head of the payload may be variable.

The material output device 10-2 has a similar configuration as the material output device 10-1. The material output device 10-2 outputs a plurality of kinds of MMTP packets for video images, audio, and closed captions to the multiplexing device 20-2.

The multiplexing devices 20-1 and 20-2 comprise, for example, a CPU, and an FPGA which performs a predetermined processing in accordance with the control from the CPU. The multiplexing devices 20-1 and 20-2 may also be configured to comprise an LSI instead of the FPGA. The multiplexing devices 20-1 and 20-2 may also be configured to perform a predetermined processing by having the CPU execute software processing.

The multiplexing device 20-1 multiplexes the MMTP packet output from the material output device 10-1 and obtains first multiplexed data. The multiplexing device 20-1 outputs the first multiplexed data to the scrambler 30-1. The multiplexing device 20-1 outputs the first multiplexed data output from the scrambler 30-1 to the switching device 40.

The multiplexing device 20-2 multiplexes the MMTP packet output from the material output device 10-2 and obtains second multiplexed data. The multiplexing device 20-2 outputs the second multiplexed data to the scrambler 30-2. The multiplexing device 20-2 outputs the second multiplexed data output from the scrambler 30-2 to the switching device 40.

The scrambler 30-1 comprises, for example, a CPU, and an FPGA which performs a predetermined processing in accordance with the control from the CPU. FIG. 4 is a block diagram showing an example of a functional configuration of the scrambler 30-1 shown in FIG. 1. The functions of a packet header analyzing unit 31, a payload analyzing unit 32, a scramble processing unit 33, and a switching unit 34 shown in FIG. 4 are realized by having the CPU execute the functions designed in the FPGA. A controller 35 shown in FIG. 4 is configured by the CPU. The scrambler 30-1 may also be configured to realize the functions shown in FIG. 4 by comprising an LSI instead of the FPGA. The scrambler 30-1 may also be configured to realize the functions shown in FIG. 4 by having the CPU execute the software processing.

The packet header analyzing unit 31 receives the first multiplexed data output from the multiplexing apparatus 20-1. The packet header analyzing unit 31 analyzes the head part of the MMTP packet included in the received first multiplexed data, and acquires packet information regarding the MMTP packet. When the packet header analyzing unit 31 ends analyzing the header part of the MMTP packet, it notifies the controller 35 that the analysis is ended, and outputs the acquired packet information to the controller 35.

The payload analyzing unit 32 receives the first multiplexed data output from the multiplexing apparatus 20-1. The payload analyzing unit 32 analyzes the payload part of the MMTP packet included in the received first multiplexed data in accordance with the control from the controller 35. After the payload analyzing unit 32 reads data of the predetermined number of bytes, for example, for eight bytes, it notifies the controller 35 accordingly. Here, data for eight bytes is up to the MPU sequence number shown in FIG. 3. After notifying the controller 35 that the payload part for eight bytes has been read, the payload analyzing unit 32 gives instructions to the scramble processing unit 33 to apply scrambling to data from the ninth byte. When the payload analyzing unit 32 ends analyzing the payload part of the MMTP packet, it notifies the controller 35 that the analysis has been ended.

The scramble processing unit 33 receives the first multiplexed data output from the multiplexing apparatus 20-1. When receiving the instruction to start scrambling from the payload analyzing unit 32, the scramble processing unit 33 applies scrambling to corresponding data within the MMTP packet included in the received first multiplexed data using a preset cryptographic algorithm. The scramble processing unit 33 outputs the data applied scrambling to the switching unit 34. An encryption key the scramble processing unit 33 uses for scrambling processing may be preset, externally set, information included in the MMTP packet header, or a combination of these.

The switching unit 34 receives the first multiplexed data output from the multiplexing apparatus 20-1 and the data output from the scramble processing unit 33. The switching unit 34 switches one of the received data and outputs it to the multiplexing apparatus 20-1 in accordance with the control from the controller 35.

Specifically, regarding the first eight bytes, the switching unit 34 outputs data that is not scrambled to the multiplexing apparatus 20-1. Meanwhile, regarding the bytes after the first eight bytes, that is, after the MPU sequence number, the switching unit 34 outputs the data output from the scramble processing unit 33 to the multiplexing apparatus 20-1.

When the controller 35 is notified that the analysis is ended and receives the packet information from the packet header analyzing unit 31, it controls the payload analyzing unit 32 to start analyzing the payload part based on the packet information.

The controller 35 controls the switching unit 34 in accordance with the notification from the payload analyzing unit 32. That is, before being notified from the payload analyzing unit 32 that the data for eight bytes has been read, the controller 35 has the switching unit 34 output data that has not had scrambling applied. In the case of being notified that the data for eight bytes has been read, the controller 35 switches the switching unit 34 so as to output the scrambled data.

In the case of being notified from the payload analyzing unit 32 that the analysis is ended, the controller 35 gives instructions to the packet header analyzing unit 31 to wait for input of the next MMTP packet.

The scrambler 30-2 has the same configuration as the scrambler 30-1. The scrambler 30-2 outputs the second multiplexed data to which scrambling has been applied to the multiplexing apparatus 20-2.

The switching apparatus 40 comprises, for example, a CPU and an FPGA which performs a predetermined processing in accordance with the control from the CPU. FIG. 5 is a block diagram showing an example of a configuration of the switching apparatus 40 shown in FIG. 1. The functions of a first packet header analyzing unit 41, a first payload analyzing unit 42, a second packet header analyzing unit 43, a second payload analyzing unit 44, and a switching unit 45 shown in FIG. 5 are realized by having the CPU execute the function designed in the FPGA. A controller 46 shown in FIG. 5 is configured by the CPU. The switching apparatus 40 may also be configured to realize the functions shown in FIG. 5 by comprising an LSI instead of the FPGA. The switching device 40 may also be configured to realize the functions shown in FIG. 5 by having the CPU execute the software processing.

The first packet header analyzing unit 41 receives the first multiplexed data output from the multiplexing apparatus 20-1. The first packet header analyzing unit 41 analyzes the header part of the MMTP packet included in the received first multiplexed data and acquires packet information regarding the MMTP packet. After the first packet header analyzing unit 41 ends analyzing the header part of the MMTP packet, it notifies the controller 46 that the analysis is ended and outputs the acquired packet information to the controller 46.

The first payload analyzing unit 42 receives the first multiplexed data output from the multiplexing apparatus 20-1. In accordance with the control from the controller 46, the first payload analyzing unit 42 analyzes the payload part of the MMTP packet included in the received first multiplexed data. After the first payload analyzing unit 42 reads data of a predetermined number of bytes, for example, for eight bytes, it outputs the read information to the controller 46 as first payload information. Here, the first payload information includes information from a payload length to an MPU sequence number shown in FIG. 3. After the first payload analyzing unit 42 outputs the first payload information to the controller 46, it notifies the controller 46 that the analysis is ended.

The second packet header analyzing unit 43 receives the second multiplexed data output from the multiplexing apparatus 20-2. The second packet header analyzing unit 43 analyzes the header part of the MMTP packet included in the received second multiplexed data and acquires packet information regarding the MMTP packet. When the analysis regarding the header part of the MMTP packet is ended, the second packet header analyzing unit 43 notifies the controller 46 that the analysis is ended and outputs the acquired packet information to the controller 46.

The second payload analyzing unit 44 receives the second multiplexed data output from the multiplexing apparatus 20-2. The second payload analyzing unit 44 analyzes the payload part of the MMTP packet included in the received second multiplexed data in accordance with the control from the controller 46. After the second payload analyzing unit 44 reads data of a predetermined number of bytes, for example, for eight bytes, it outputs the read information to the controller 46 as second payload information. Here, the second payload information includes information from a payload length to an MPU sequence number shown in FIG. 3. After the second payload analyzing unit 44 outputs the second payload information to the controller 46, it notifies the controller 46 that the analysis is ended.

The switching unit 45 receives the first multiplexed data output from the multiplexing apparatus 20-1 and the second multiplexed data output from the multiplexing apparatus 20-2. In accordance with the control from the controller 46, the switching unit 45 switches the first multiplexed data to the second multiplexed data, and the second multiplexed data to the first multiplexed data. The switching unit 45 outputs a signal obtained after switching to a subsequent stage. The signal output from the switching unit 45 is transmitted from a transmitter (unillustrated).

When the controller 46 is notified that the analysis has been ended from the first packet header analyzing unit 41, the controller 46 controls the first payload analyzing unit 42 to start analyzing the payload part based on the packet information. When the controller 46 is notified that the analysis has been ended from the second packet header analyzing unit 43, the controller 46 controls the second payload analyzing unit 44 to start analyzing the payload part based on the packet information.

When an instruction to switch the outputs is input to the controller 46, the controller 46 controls the switching unit 45 based on the first payload information from the first payload analyzing unit 42 and the second payload information from the second payload analyzing unit 44.

A switching control of the switching unit 45 by the controller 46 will be explained specifically with reference to FIG. 6. In FIG. 6, the first multiplexed data and the second multiplexed data include a video MMTP packet (MMTP_V) and an audio MMTP packet (MMTP_A). In many cases, although the packet arrangements of the first multiplexed data and the second multiplexed data are the same, in some cases, the packet arrangements differ for some reason occurring at the material output apparatuses 10-1 and 10-2. In FIG. 6, an example in the case where the packet arrangement of the first multiplexed data and the packet arrangement of the second multiplexed data differ will be explained. In FIG. 6, the output is switched from the first multiplexed data to the second multiplexed data.

In FIG. 6, (a) indicates the first multiplexed data output from the multiplexing apparatus 20-1, and (b) indicates the second multiplexed data output from the multiplexing apparatus 20-2.

In FIG. 6, first of all, MMTP_V11 and MMTP_V21 are input to the switching apparatus 40. The first packet header analyzing unit 41 analyzes the header part of MMTP_V11 and acquires packet information. The first payload analyzing unit 42 acquires the payload length and the MPU sequence number from the payload part of MMTP_V11. According to FIG. 6, the MPU sequence number of MMTP_V11 is "M."

Subsequent to MMTP_V11, MMTP_V12, MMTP_V13, MMTP_V14, MMTP_A11, MMTP_V15, MMTP_V16, MMTP_A12, MMTP_A13, MMTP_V17, and MMTP_V18 are input sequentially. The first packet header analyzing unit 41 analyzes the header part each time an MMTP packet is input, and acquires the packet information. The first payload analyzing unit 42 acquires the payload length and the MPU sequence number from the payload part each time the MMTP packet is input. According to FIG. 6, the MPU sequence number of MMTP_V12 to MMTP_V13 is "M," the MPU sequence number of MMTP_V14 to MMTP_V18 is "M+1," the MPU sequence number of MMTP_A11 is "N," and the MPU sequence number of MMTP_A12 to MMTP_A13 is "N+1."

The second packet header analyzing unit 43 analyzes the header part of MMTP_V21 and acquires the packet information. The second payload analyzing unit 44 acquires the payload length and the MPU sequence number from the payload part of MMTP_V21. According to FIG. 6, the MPU sequence number of MMTP_V21 is "P."

Subsequent to MMTP_V21, MMTP_V22, MMTP_A21, MMTP_V23, MMTP_A22, MMTP_V24, MMTP_V25, MMTP_A23, MMTP_V26, MMTP_A24, and MMTP_V27 are input sequentially. The second packet header analyzing unit 43 analyzes the header part each time an MMTP packet is input, and acquires the packet information. The second payload analyzing unit 44 acquires the payload length and the MPU sequence number from the payload part each time the MMTP packet is input. According to FIG. 6, the MPU sequence number of MMTP_V22 to MMTP_V24 is "P," the MPU sequence number of MMTP_V25 to MMTP_V27 is "P+1," the MPU sequence number of MMTP_A21 to MMTP_A23 is "Q," and the MPU sequence number of MMTP_A24 is "Q+1."

In the case where the MPU sequence number that was "M" up to MMTP_V13 has changed to "M+1" at MMTP_V14, the controller 46 determines that there is a video MPU boarder between MMTP_V13 and MMTP_V14.

In the case where the MPU sequence number that was "P" up to MMTP_V24 has changed to "P+1" at MMTP_V25, the controller 46 determines that there is a video MPU boarder between MMTP_V24 and MMTP_V25. When the video MPU boarder is detected in the first and the second multiplexed data, the controller 46 switches the switching unit 45 in a manner that the MMTP packet subsequent to MMTP_V13 becomes MMTP_V25. When the MMTP packets are switched, the controller 46 updates the packet sequence number and a packet counter (if exists) included in the header of the MMTP packet of and after MMTP_V25.

In the case where the MPU sequence number that was "N" up to MMTP_A11 has changed to "N+1" at MMTP_A12, the controller 46 determines that there is an audio MPU boarder between MMTP_A11 and MMTP_A12.

In the case where the MPU sequence number that was "Q" up to MMTP_A23 has changed to "Q+1" at MMTP_A24, the controller 46 determines that there is an audio MPU boarder between MMTP_A23 and MMTP_A24. When the audio MPU boarder is detected in the first and the second multiplexed data, the controller 46 switches the switching unit 45 in a manner that the MMTP packet subsequent to MMTP_A11 becomes MMTP_A24. When the MMTP packets are switched, the controller 46 updates the packet sequence number and a packet counter included in the header of the MMTP packet of and after MMTP_A24 so as to maintain sequentiality. Furthermore, the MPU sequence number included in the payload of the MMTP packet may also be updated in a manner of maintaining sequentiality.

FIG. 7 is a block diagram showing a functional configuration of the receiver 50 according to the first embodiment. The receiver 50 shown in FIG. 7 comprises a receiving processing unit 51, a separation device 52, a descrambler 53, a video decoder 54, an audio decoder 55, and a caption decoder 56.

The receiving processing unit 51 comprises, for example, a CPU and an FPGA which performs a predetermined processing in accordance with the control from the CPU. The receiving processing unit 51 may be configured to comprise an LSI instead of the FPGA. The receiving processing unit 51 may be configured to perform a predetermined processing by having the CPU execute software processing. The receiving processing unit 51 receives a signal transmitted from the MMT transmission system. The receiving processing unit 51 applies frequency conversion processing and amplification processing to the received signal. The receiving processing unit 51 outputs the processed signal to the separation device 52.

The separation device 52 comprises, for example, a CPU and an FPGA which performs a predetermined processing in accordance with the control from the CPU. The separation device 52 may be configured to comprise an LSI instead of the FPGA. The separation device 52 may be configured to perform a predetermined processing by having the CPU execute software processing. The separation device 52 separates the MMTP packets regarding video images, audio, and closed captions multiplexed on the signal output from the receiving processing unit 51. The separation device 52 outputs the separated MMTP packets to the descrambler 53. The separation device 52 also receives the descrambled MMTP packets from the descrambler 53. The separation device 52 outputs the MMTP packets regarding video images output from the descrambler 53 to the video decoder 54. The separation device 52 outputs the MMTP packets regarding audio output from the descrambler 53 to the audio decoder 55. The separation device 52 outputs the MMTP packets regarding closed captions output from the descrambler 53 to the caption decoder 56.

The descrambler 53 comprises, for example, a CPU and an FPGA which performs a predetermined processing in accordance with the control from the CPU. The descrambler 53 realizes the functions shown in FIG. 8 by the CPU executing the functions designed in the FPGA. FIG. 8 is a block diagram showing an example of a functional configuration of the descrambler 53 shown in FIG. 7. The functions of the packet header analyzing unit 531, the payload analyzing unit 532, the descramble processing unit 533, and the switching unit 534 shown in FIG. 8 may be realized by the CPU executing the functions designed in the FPGA. A controller 535 shown in FIG. 8 is configured by the CPU. The descrambler 53 may be configured to realize the functions shown in FIG. 8 by comprising an LSI instead of the FPGA. The descrambler 53 may be configured to realize the functions shown in FIG. 8 by having the CPU execute the software processing.

The packet header analyzing unit 531 receives the MMTP packet output from the separation device 52. The packet header analyzing unit 531 analyzes the head part of the received MMTP packet and acquires packet information regarding the MMTP packet. When the packet header analyzing unit 531 ends analyzing the header part of the MMTP packet, it notifies the controller 535 that the analysis is ended, and outputs the acquired packet information to the controller 535.

The payload analyzing unit 532 receives the MMTP packet output from the separation device 52. The payload analyzing unit 532 analyzes the payload part of the received MMTP packet in accordance with the control from the controller 535. After the payload analyzing unit 532 reads data of the predetermined number of bytes, for example, for eight bytes, it notifies the controller 535 accordingly. After the payload analyzing unit 532 notifies the controller 535 that eight bytes of the payload part has been read, it instructs the descramble processing unit 533 to descramble data from the ninth byte. When the payload analyzing unit 532 ends analyzing the payload part of the MMTP packet, it notifies the controller 535 that the analysis is ended.

The descramble processing unit 533 receives the MMTP packet output from the separation device 52. When receiving the descrambling instruction from the payload analyzing unit 532, the descramble processing unit 533 descrambles the corresponding scrambled data in the received MMTP packet. The descramble processing unit 533 outputs the descrambled data to the switching unit 534. An encryption key the descramble processing unit 533 uses for descrambling may be preset, externally set, information included in the MMTP packet header, or a combination of these.

The switching unit 534 receives the data output from the separation device 52 and the data output from the descramble processing unit 533. In accordance with the control from the controller 535, the switching unit 534 switches one of the received data and outputs it to the separation device 52.

Specifically, for the first eight bytes in the MMTP packet, the switching unit 534 outputs the data output from the separation device 52 to the separation device 52. For the bytes after the first eight bytes, that is, after the MPU sequence number, the switching unit 534 outputs data output from the descramble processing unit 533 to the separation device 52.

When the controller 535 is notified that the analysis is ended and receives the packet information from the packet header analyzing unit 531, it controls the payload analyzing unit 532 to start analyzing the payload part based on the packet information.

The controller 535 controls the switching unit 534 in accordance with the notification from the payload analyzing unit 532. That is, before being notified from the payload analyzing unit 532 that the data for eight bytes has been read, the controller 535 has the switching unit 534 output data output from the separation device 52. In the case of being notified that the data for eight bytes has been read, the controller 535 switches the switching unit 534 so as to output the descrambled data.

In the case of being notified from the payload analyzing unit 532 that the analysis is ended, the controller 535 gives instructions to the packet header analyzing unit 531 to wait for input of the next MMTP packet.

The video decoder 54 decodes the MMTP packets regarding video images output from the separation device 52, and outputs it to devices of subsequent stages including a display unit. The audio decoder 55 decodes the MMTP packets regarding audio output from the separation device 52 and outputs it to devices of subsequent stages including the display unit. The caption decoder 56 decodes the MMTP packets regarding closed caption output from the separation device 52 and outputs it to devices of subsequent stages including the display unit.

In the manner mentioned above, the MMT transmission system according to the first embodiment applies scrambling to the MMTP packet by the scramblers 30-1 and 30-2. When doing so, the scramblers 30-1 and 30-2 are configured to apply scrambling to data after the eight bytes, that is, after the MPU sequence number, in the payload part of the MMTP packet. In this manner, the switching apparatus 40 would be able to read the MPU sequence number without having to descramble the received MMTP packet. That is, the switching apparatus 40 would be able to identify the MPU boarder without having to descramble the received MMTP packet.

Therefore, according to the MMT transmission system of the first embodiment, the MMTP packet may be switched seamlessly without having to descramble the MMTP packet and analyze the descrambled MMTP packet. According to the scramblers 30-1 and 30-2 of the first embodiment, the switching apparatus 40 is capable of seamlessly switching the MMTP packet without having to descramble the MMTP packet and analyze the descrambled MMTP packet.

In the payload part of the MMTP packet, the payload length is included in the eight bytes to which scrambling is not applied. Therefore, the switching apparatus 40 would be able to read the packet length without having to descramble the received MMTP packet.

In the payload part of the MMTP packet, information indicating the characteristic of the payload part is included in the eight bytes to which scrambling is not applied. Therefore, in the case where an error has occurred in the MMTP packet, the switching apparatus 40 would be able to identify the MMTP packet in which the error has occurred without descrambling the received MMTP packet, which, as a result, would facilitate identifying the cause of the error.

According to the receiver 50 of the first embodiment, the descrambler 53 descrambles the MMTP packet. When doing so, in the payload part of the MMTP packet, the descrambler 53 is configured to descramble the data after the eight bytes, that is, the data after the MPU sequence number. This will allow the receiver 50 to process the data transmitted from the MMT transmission system.

Second Embodiment

In the first embodiment, an example in the case where the MMT transmission system comprises the functional configurations shown in FIG. 1 has been explained. However, the functional configurations of the MMT transmission system are not limited to FIG. 1. For example, a case in which the MMT transmission system comprises the functional configurations shown in FIG. 9 may also be considered. The MMT transmission system shown in FIG. 9 comprises material output apparatuses 10-1 and 10-2, multiplexing apparatuses 60-1 and 60-2, scramblers 70-1 and 70-2, and a switching apparatus 40.

The multiplexing apparatus 60-1 multiplexes the MMTP packet output from the material output apparatus 10-1 and obtains first multiplexed data. The multiplexing apparatus 60-1 outputs the first multiplexed data to the scrambler 70-1.

The multiplexing apparatus 60-2 multiplexes the MMTP packet output from the material output apparatus 10-2 and obtains second multiplexed data. The multiplexing apparatus 60-2 outputs the second multiplexed data to the scrambler 70-2.

The scrambler 70-1 performs the same processing as that performed in the scrambler 30-1 presented in the first embodiment to corresponding data within the MMTP packet included in the first multiplexed data output from the multiplexing apparatus 60-1. In other words, in the payload part of the MMTP packet, the scrambler 70-1 applies scrambling to data after, for example, eight bytes, that is, after the MPU sequence number. The scrambler 70-1 outputs data obtained by scrambling a part of the payload part to the switching apparatus 40.

The scrambler 70-2 performs the same processing as that performed in the scrambler 30-2 presented in the first embodiment to corresponding data within the MMTP packet included in the second multiplexed data output from the multiplexing apparatus 60-2. In other words, in the payload part of the MMTP packet, the scrambler 70-2 applies scrambling to data after, for example, eight bytes, that is, after the MPU sequence number. The scrambler 70-2 outputs data obtained by scrambling a part of the payload part to the switching apparatus 40.

An encryption key the scramblers 70-1 and 70-2 use for the scrambling processing may be preset, externally set, information included in the MMTP packet header, or a combination of these.

By comprising the configurations mentioned above, the MMT transmission system according to the second embodiment is capable of identifying the MPU boarder without having to descramble the MMTP packet at the switching apparatus 40.

Therefore, according to the MMT transmission system of the second embodiment, the MMTP packet may be switched seamlessly without having to descramble the MMTP packet and analyze the descrambled MMTP packet. According to the scramblers 70-1 and 70-2 of the second embodiment, the switching apparatus 40 is capable of seamlessly switching the MMTP packet without having to descramble the MMTP packet and analyze the descrambled MMTP packet.

In the payload part of the MMTP packet, the payload length is included in the eight bytes which are not scrambled. Therefore, the switching apparatus 40 may be able to read the packet length without having to descramble the received MMTP packet.

In the payload part of the MMTP packet, the information indicating the characteristic of the payload part is included in the eight bytes which are not scrambled. Therefore, in the case where an error has occurred in the MMTP packet, the switching apparatus 40 would be able to identify the cause of the occurred error without having to descramble the received MMTP packet.

FIG. 10 is a block diagram showing an example of a functional configuration of a receiver 80 according to the second embodiment. The receiver 80 shown in FIG. 10 comprises a receiving processing unit 51, a descrambler 81, a separation device 82, a video decoder 54, an audio decoder 55, and a caption decoder 56.

The descrambler 81 receives multiplexed data output from the receiving processing unit 51. The descrambler 81 performs the same processing as that performed in the descrambler 53 presented in the first embodiment to descramble corresponding data to which scrambling has been applied within the MMTP packet included in the multiplexed data output from the receiving processing unit 51. At this time, in the payload part of the MMTP packet, the descrambler 81 descrambles, for example, data after the eight bytes, that is, after the MPU sequence number. The descrambler 81 outputs the descrambled MMTP packet to the separation device 82. An encryption key the descrambler 81 uses for the descrambling may be preset, externally set, information included in the MMTP packet header, or a combination of these.

The separation device 82 separates the MMTP packets regarding video images, audio, and closed captions multiplexed on the signal output from the descrambler 81. Among the separated MMTP packets, the separation device 82 outputs the MMTP packet regarding the video images to the video decoder 54. Among the separated MMTP packets, the separation device 82 outputs the MMTP packet regarding the audio to the audio decoder 55. Among the separated MMTP packets, the separation device 82 outputs the MMTP packet regarding the closed captions to the caption decoder 56.

The above configurations allow the receiver 50 according to the second embodiment to process data transmitted from the MMT transmission system.

Other Embodiments

In the first and second embodiments, an example of a case in which the scramblers 30-1, 30-2, 70-1, and 70-2 comprise the packet header analyzing unit 31, the payload analyzing unit 32, the scramble processing unit 33, the switching unit 34, and the controller 35 has been explained. However, the configuration is not limited to this. As shown in FIG. 11, the scramblers 30-1, 30-2, 70-1, and 70-2 may be configured to further comprise a TLV (Type Length Value) header analyzing unit 36. The TLV header analyzing unit 36 is realized by the CPU, for example, comprised by the scramblers 30-1, 30-2, 70-1, and 70-2 executing the functions designed in the FPGA. The TLV header analyzing unit 36 may be configured to be realized by using an LSI instead of the FPGA. The TLV header analyzing unit 36 may be configured to be realized by having the CPU execute software processing.

In the following, representing the embodiment, a case in which the scrambler 30-1 comprises the TLV header analyzing unit 36 will be explained.

In the case where the scrambler 30-1 comprises the TLV header analyzing unit 36, the material output apparatus 10-1 outputs to the multiplexing apparatus 20-1 an IP packet on which an MMTP packet regarding a video image is mounted, an IP packet on which an MMTP packet regarding audio is mounted, and an IP packet on which an MMTP packet regarding a closed caption is mounted. The multiplexing apparatus 20-1 multiplexes an IP packet on which an MMTP packet is mounted on a broadcast transmission path using an TLV multiplexing scheme which is a multiplexing scheme of an IP packet. The multiplexing apparatus 20-1 outputs the multiplexed data to the scrambler 30-1 as first multiplexed data.

The TLV header analyzing unit 36 receives the first multiplexed data output from the multiplexing apparatus 20-1. The TLV header analyzing unit 36 analyzes a header part of the TLV packet included in the received first multiplexed data, and acquires TLV information regarding the TLV packet. When the TLV header analyzing unit 36 ends analyzing the header part of the TLV packet, it notifies the controller 35 that the analysis is ended and outputs the acquired TLV information to the controller 35.

When the controller 35 is notified that the analysis is ended and receives the TLV information from the TLV header analyzing unit 36, it controls the packet header analyzing unit 31 to start analyzing the head part of the MMTP packet based on the TLV information.

In this manner, in the case where the scrambler 30-1 comprises the TLV header analyzing unit 36, the scrambler 30-1 will follow the processing procedures of first analyzing the TLV header by the TLV header analyzing unit 36, next, analyzing the header of the MMTP packet by the packet header analysis part 31, and then analyzing the payload part by the payload analyzing unit 32.

In the case where the multiplexing apparatus 20-1 multiplexes the IP packet on which the MMTP packet is mounted on the broadcast transmission path using the TLV multiplexing scheme which is a multiplexing scheme of an IP packet, the payload length does not necessarily have to be included in the payload part. In the case where the payload length is included in the TLV information, the first and the second payload analyzing units 42 and 44 of the switching apparatus 40 may be configured to perform analysis of the payload part using the payload length included in the TLV information.

An encryption key the scrambler 30-1 uses for the scrambling processing may be preset, externally set, information included in the MMTP packet header, or a combination of these.

In the first and the second embodiments, an example in the case where the descramblers 53 and 81 comprise the packet header analyzing unit 531, the payload analyzing unit 532, the descramble processing unit 533, the switching unit 534, and the controller 535 has been explained. However, the configuration is not limited to this. As shown in FIG. 12, the descramblers 53 and 81 may be configured to further comprise a TLV header analyzing unit 536. The TLV header analyzing unit 536 is realized by the CPU which the descramblers 53 and 81 comprise executing the functions designed in the FPGA. The TLV header analyzing unit 536 may be configured to be realized by using an LSI instead of the FPGA. The TLV header analyzing unit 536 may be configured to be realized by having the CPU execute software processing.

In the following, representing the embodiment, a case in which the descrambler 53 comprises the TLV header analyzing unit 536 will be explained.

In the case where the descrambler 53 comprises the TLV header analyzing unit 536, the MMT transmission system multiplexes an IP packet on which an MMTP packet is mounted on the broadcast transmission path using the TLV multiplexing scheme which is a multiplexing scheme of an IP packet.

The TLV header analyzing unit 536 receives multiplexed data transmitted from the MMT transmission system. The TLV header analyzing unit 536 analyzes the header part of the TLV packet included in the received multiplexed data and acquires TLV information regarding the TLV packet. When the TLV header analyzing unit 536 ends analyzing the header part of the TLV packet, it notifies the controller 535 that the analysis is ended and outputs the acquired TLV information to the controller 535.

When the controller 535 is notified that the analysis is ended and receives the TLV information from the TLV header analyzing unit 536, it controls the packet header analyzing unit 531 to start analyzing the head part of the MMTP packet based on the TLV information.

In this manner, in the case where the descrambler 53 comprises the TLV header analyzing unit 536, the descrambler 53 will carry out the processing procedure of first analyzing the TLV header by the TLV header analyzing unit 536, next, analyzing the header of the MMTP packet by the packet header analyzing unit 531, and then analyzing the payload part by the payload analyzing unit 532.

An encryption key the descrambler 53 uses for the descrambling may be preset, externally set, information included in the MMTP packet header, or a combination of these.

In the case where the MMT transmission system multiplexes the IP packet on which the MMTP packet is mounted on a broadcast transmission path using the TLV multiplexing scheme which is a multiplexing scheme of an IP packet, the payload length does not necessarily have to be included in the payload unit. In the case where the payload length is included in the TLV information, the payload analyzing unit 532 of the descrambler 53 may be configured to perform analysis of the payload part using the payload length included in the TLV information.

In the first and second embodiments, an example in the case where the payload analyzing unit 32 reads eight bytes of data and notifies the controller 35 accordingly has been explained. However, the embodiments are not limited to the description. For example, in addition to eight bytes, the payload analyzing unit 32 may be configured to read 14 more bytes, that is, 22 bytes of data, and notify the controller 35 accordingly. Here, 22 bytes of data is up to the dependency counter shown in FIG. 3. Here, the payload analyzing unit 32 is explained; however, the same also applies to other payload analyzing units.

An operation which becomes the trigger of notifying the controller 35 is not limited to reading the preset number of bytes. For example, the payload analyzing unit 32 may be configured to search for MFU (Media Fragment Unit) data shown in FIG. 3, and, when detecting the MFU data, notify the controller 35 accordingly. This allows only the MFU data in the payload part to be the target of scrambling. Here, the payload analyzing unit 32 is explained; however, the same also applies to other payload analyzing units.

In the first and second embodiments, an example in a case where there are two material output apparatuses has been explained; however, the number of material output apparatuses is not limited to two. Furthermore, the constituent elements are also not limited to only one video image and one audio, and may include a still image, application program, and closed caption data, etc.; however, message information is excluded.

While certain embodiments have been described, these embodiments have been presented by way of example only, and are not intended to limit the scope of the inventions. Indeed, the embodiments described herein may be embodied in a variety of other forms; furthermore, various omissions, substitutions, and changes in the form of the embodiments described herein may be made without departing from the spirit of the invention. The accompanying claims and their equivalents are intended to cover such forms or modifications as would fall within the scope and spirit of the invention.

What is claimed is:

1. An MMT (MPEG Multimedia Transport) transmission system comprising:
   a first material output apparatus which transmits a first MMTP (MPEG Multimedia Transport Protocol) packet;
   a first multiplexing apparatus which multiplexes the first MMTP packet to obtain first multiplexed data;
   a first encryption processing apparatus which encrypts a first payload of the first MMTP packet included in the first multiplexed data, except for at least a first MPU sequence number;
   a second material output apparatus which transmits a second MMTP packet;
   a second multiplexing apparatus which multiplexes the second MMTP packet to obtain second multiplexed data;
   a second encryption processing apparatus which encrypts a second payload of the second MMTP packet included in the second multiplexed data, except for at least a second MPU sequence number; and
   a switching apparatus which receives the first and the second multiplexed data encrypted by the first and the second encryption processing apparatuses, acquires a first MPU (Media Processing Unit) border from the first MPU sequence number described in the first payload, acquires a second MPU border from the second MPU sequence number described in the second payload, and switches transmission from the first multiplexed data to the second multiplexed data at the first MPU border and the second MPU border in accordance with a switching instruction.

2. The MMT transmission system according to claim 1, wherein
   the first encryption processing apparatus encrypts the first payload except for a preset capacity from its head, and the second encryption processing apparatus encrypts the second payload except for the capacity from its head.

3. The MMT transmission system according to claim 2, wherein the preset capacity is eight bytes.

4. The MMT transmission system according to claim 2, wherein the preset capacity is 22 bytes.

5. The MMT transmission system according to claim 1, wherein
the first encryption processing apparatus encrypts only first MFU (Media Fragment Unit) data included in the first payload, and
the second encryption processing apparatus encrypts only second MFU data included in the second payload.

6. The MMT transmission system according to claim 1, wherein
the first encryption processing apparatus encrypts the first payload except for a first payload length,
the second encryption processing apparatus encrypts the second payload except for a second payload length, and
the switching apparatus acquires the first MPU border from the first payload length and the first MPU sequence number described in the first payload, and acquires the second MPU border from the second payload length and the second MPU sequence number described in the second payload.

7. The MMT transmission system according to claim 1, wherein
the switching apparatus reads a first payload length described in a packet header prior to the first MMTP packet, reads a second payload length described in a packet header prior to the second MMTP packet, acquires the first MPU border from the first payload length and the first MPU sequence number described in the first payload, and acquires the second MPU border from the second payload length and the second MPU sequence number described in the second payload.

8. An encryption processing apparatus comprising:
a processor which analyzes a header part of an MMTP (MPEG Multimedia Transport Protocol) packet included in multiplexed data;
analyzes a payload part of the MMTP packet by utilizing an analysis result of the header part; and
encrypts the payload part, except for at least an MPU sequence number, by utilizing an analysis result of the payload part.

9. The encryption processing apparatus according to claim 8, wherein the processor encrypts from its head the payload part except for a preset capacity.

10. The encryption processing apparatus according to claim 9, wherein the preset capacity is eight bytes.

11. The encryption processing apparatus according to claim 9, wherein the preset capacity is 22 bytes.

12. The encryption processing apparatus according to claim 8, wherein the processor encrypts only MFU (Media Fragment Unit) data included in the payload part.

13. The encryption processing apparatus according to claim 8, wherein the processor encrypts the payload part except for a payload length.

14. A receiver, comprising:
a descrambler which analyzes a header part of an MMTP (MPEG Multimedia Transport Protocol) packet included in multiplexed data;
analyzes a payload part of the MMTP packet by utilizing an analysis result of the header part; and
decrypts encryption applied to at least payload data after an MPU sequence number in the payload part by utilizing an analysis result of the payload part; and
a decoder which decodes the decrypted MMTP packet.

15. The receiver according to claim 14, wherein the descrambler decrypts encryption applied to data except for a preset capacity from the head of the payload part.

16. The receiver according to claim 15, wherein the preset capacity is eight bytes.

17. The receiver according to claim 15, wherein the preset capacity is 22 bytes.

18. The receiver according to claim 14, wherein the descrambler decrypts encryption applied only to MFU (Media Fragment Unit) data in the payload part.

* * * * *